United States Patent [19]

Wilsey

[11] Patent Number: 5,036,616
[45] Date of Patent: Aug. 6, 1991

[54] FISH BAIT JIGGER

[76] Inventor: Steven M. Wilsey, 927 Anchorage Ct., Oshkosh, Wis. 54901

[21] Appl. No.: 543,098

[22] Filed: Jun. 25, 1990

[51] Int. Cl.⁵ ............................................. A01K 89/00
[52] U.S. Cl. ...................................... 43/26.1; 43/19.2
[58] Field of Search .......................... 43/26.1, 19.2, 25

[56] References Cited

U.S. PATENT DOCUMENTS

| | | | |
|---|---|---|---|
| 3,789,534 | 2/1974 | Yankaitis | 43/19.2 |
| 4,349,978 | 9/1982 | Philip | 43/19.2 |
| 4,420,900 | 12/1983 | Nestor | 43/19.2 |
| 4,700,501 | 10/1987 | Bryan | 43/26.1 |
| 4,821,448 | 4/1989 | Lindaberry | 43/19.2 |

Primary Examiner—Kurt Rowan
Assistant Examiner—Chuck Y. Mah
Attorney, Agent, or Firm—Donald Cayen

[57] ABSTRACT

A fish bait jigger imparts motion to the fish bait of a fishing pole or the like that is not held by a fisherman. The fish bait jigger comprises a small electric motor and battery mounted in a housing that is removably attached to the fishing pole. A roller is mounted to the motor shaft. The fish line is placed over the periphery of the roller. The roller is rotated by the motor to produce an eccentric motion to the roller periphery, thereby jigging the bait. The roller periphery may be circular or non-circular.

16 Claims, 1 Drawing Sheet

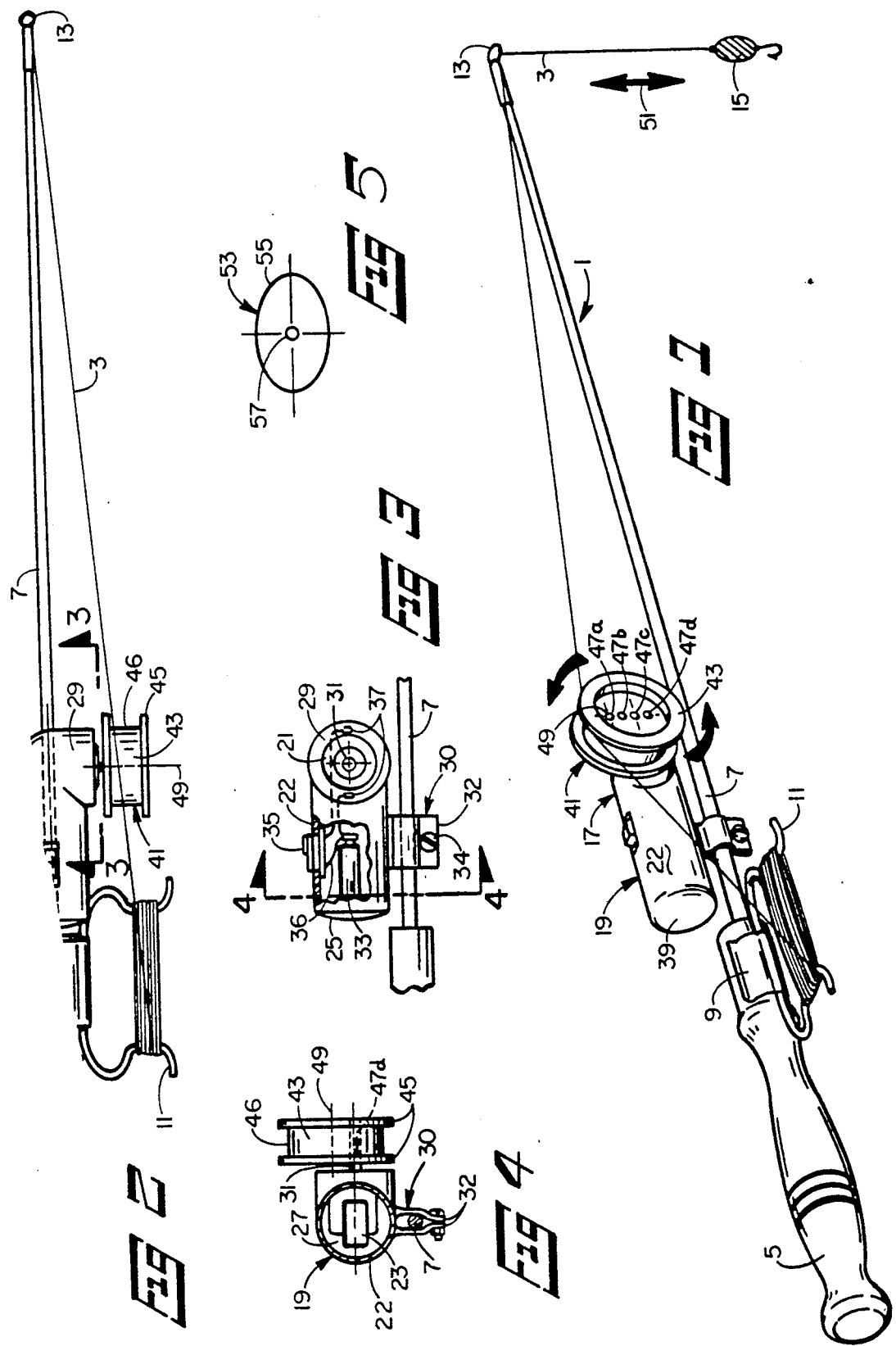

FISH BAIT JIGGER

BACKGROUND OF THE INVENTION

1. Field of the Invention

This invention pertains to sports equipment, and more particularly to apparatus for catching fish.

2. Description of the Prior Art

Numerous types of products have been developed over the years to assist people catch fish. Rods, reels, tip-ups, and similar devices are well known.

Some fishing gear is designed to properly control a fishing line without having to be held by the fisherman. Examples of such products are shown in U.S. Pat. Nos. 3,807,078 and 3,824,730. Ice fishermen are particularly likely to take their hands off line-holding devices. As a result, specialized equipment has evolved for ice fishing. For example, in addition to holding a line in place, ice fishing gear frequently includes an alarm device that alerts the fisherman of a strike. Representative products that combine line holding apparatus with strike alarms are shown in U.S. Pat. Nos. 4,334,377 and 4,633,608.

A disadvantage of prior equipment for retaining fishing lines in place without being manually held is that the line and bait remain motionless. It is generally acknowledged by experts that fish are more readily attracted to moving bait than to bait that is stationary.

Thus, a need exists for a device that moves the bait of a fishing line that is not held by a fisherman.

SUMMARY OF THE INVENTION

In accordance with the present invention, a fish bait jigger is provided that imparts motion to the bait of a fishing pole or the like that is not directly controlled by a fisherman. This is accomplished by apparatus that includes an eccentric roller placed in contact with the fish line.

The eccentric roller is connected to the shaft of a small electric motor. The eccentric roller may be in the form of a central barrel or disk having a circular periphery bounded by two radially extending flanges. The central disk has a series of small holes extending longitudinally therethrough. The holes are offset at different radial distances from the longitudinal axis of the disk. Connection of the eccentric roller to the electric motor is achieved by pressing a selected hole of the disk over the motor shaft such that a tight fit is produced therebetween. If desired, a positive fit can be provided between the eccentric roller and the motor shaft.

The motor is mounted inside a housing that in turn is removably attached to a selected section of the fishing pole or the like. The housing is located between the stored supply of fish line and the bait. For example, the housing may be attached to a fishing pole between the reel and the pole tip. To power the motor, a small battery is inserted into the housing. An exposed on-off switch can be included in the electrical circuit between the battery and the motor.

To use the fish bait jigger, a hook and bait are affixed to the fish line in the usual manner, and they are set to the desired depth in the water. The fish line is then trained over the periphery of the eccentric roller. The electric motor is energized to rotate the electric motor and thus the eccentric roller. The flanges maintain the line in place on the eccentric roller periphery. Because the supply end of the fish line is fixed to the pole, rotation of the eccentric roller causes the hook and bait to reciprocate in the water in response to the eccentric roller rotation. The hook and bait rise and fall through a distance equal to twice the eccentricity of the eccentric roller, which is the distance between the eccentric roller longitudinal axis and the hole pressed over the motor shaft. By connecting different holes in the eccentric roller to the motor shaft, different amounts of bait movement are possible.

With the fish bait jigger in operation, the fisherman need not continuously hold his pole to assure that the bait remains jigging. As a result, fish are readily attracted to the bait, thus improving the fisherman's success even though he himself is not constantly moving the bait.

If desired, the periphery of the eccentric roller may have an elliptical or other non-circular form to provide non-uniform bait movement for even greater fish attraction. With an elliptical periphery, a single hole on the eccentric roller longitudinal axis is sufficient for pressing onto the motor shaft.

The eccentric roller may be marked with colored bands to visually indicate from a distance that it is properly rotating. The invention is adaptable to ice fishing tip-ups and poles as well as to open water fishing equipment.

Other advantages, benefits, and features of the invention will become apparent to those skilled in the art upon reading the detailed description of the invention.

BRIEF DESCRIPTION OF THE DRAWINGS

FIG. 1 is a perspective view of a fish bait jigger according to the present invention in place on a fishing pole.

FIG. 2 is a top view of FIG. 1.

FIG. 3 is a partially broken cross sectional view taken along lines 3—3 of FIG. 2.

FIG. 4 is a cross sectional view taken along lines 4—4 of FIG. 3.

FIG. 5 is a transverse cross sectional view of a modified eccentric roller.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1 and 2, a fishing pole 1 is illustrated that includes the present invention. The particular fishing pole shown is merely representative of a wide variety of poles, rods, and other equipment that are in widespread use for holding and guiding a fish line 3 for both ice and open water fishing.

The pole 1 depicted is designed primarily for ice fishing. For that purpose, it has a handle 5 and a relatively short rod 7 joined to the handle. A clip 9 snaps over the handle 5 to support a storage wire 11. The fish line 3 is wound around the storage wire 11. The fish line passes through one or more guide loops 13, and a lure, jig, or other fish bait 15 is tied to the free end of the line 3.

In accordance with the present invention, a fish bait jigger 17 is removably attached to the pole 1. Looking also at FIGS. 3 and 4, the fish bait jigger 17 is comprised of a housing 19, which, in the preferred embodiment, is in the form of a tubular cylinder having a wall 22 and a longitudinal axis 23. The housing first end 25 is open, and the housing second end 27 is closed. The housing has a hollow hub 29 extending from the wall 22 at a right angle to the longitudinal axis 23.

The housing 19 is removably attached to the pole 1 by means of a retainer 30. In the illustrated construction, the retainer 30 is comprised of a pair of flexible tabs 32 cantilever joined to the housing wall 22. The tabs 32 are designed to receive the rod 7 between them. A screw and nut arrangement 34 are used to draw the tabs 32 together to tightly grip the rod.

Mounted in the housing 19 is a small electric motor 21. The motor 21 is pressed into the housing hub 29, preferably with a water tight fit, with the motor shaft 31 extending from the end of the hub. To power the electric motor 21, a 9-volt battery 33 is inserted inside the housing 19. A conventional on-off switch 35 and wires 36 connected between the battery 33, switch 35, and motor terminals 37 complete the circuit. The housing open end 25 is sealed with a tight fitting but removable cap 39.

The fish bait jigger 17 further comprises an eccentric roller 41. The eccentric roller 41 of FIGS. 1-4 has a barrel or disk portion 43 with a longitudinal axis 49 and spaced flanges 45 extending radially from a circular disk periphery 46. A series of holes 47a-47d are formed in the eccentric roller disk at varying radial distances from the longitudinal axis 49. The diameter of the disk holes 47a-47d is slightly greater than the diameter of the electric motor shaft 31. If desired, the outer faces of the flanges 45 can be painted with one or more areas of color.

In use, a selected one of the eccentric roller holes 47a-47d is placed over the electric motor shaft 31. The relative sizes of the eccentric roller holes and the motor shaft are such that a tight fit exists between the eccentric roller and the motor shaft. In FIGS. 1 and 4, the eccentric roller hole 47d is shown as being tightly fit onto the motor shaft.

The bait 15 is tied to the free end of the fish line 3. A desired amount of line is unwound from the storage wire 11 so as to lower the bait to the desired depth in the water.

Actuating the electric motor 21 rotates the eccentric roller 41 about the hole 47d. Because of the eccentricity of the hole 47d from the eccentric roller longitudinal axis 49, a reciprocating motion as indicated by arrow 51 is set up in the bait 15. As a result, the fisherman can leave his pole 1 unattended, but the bait will continue to jiggle and attract fish while he is away. The rotating band of color on the eccentric roller flanges 45 gives an indication from a distance that the jigging action is indeed occurring.

The versatility of the fish bait jigger 17 is demonstrated by the fact that it can be attached to appropriate locations on many models of ice fishing tip-ups. Further, the periphery of the eccentric roller disk portion 43 need not be circular, but it may be an elliptical or other shape to impart a non-uniform reciprocation to the bait 15. FIG. 5 shows an eccentric roller 53 having an elliptical periphery 55. With a non-circular disk periphery, a single mounting hole 57 located on the eccentric roller longitudinal axis is usually sufficient to give good bait jigging action. Of course, the eccentric roller 53 can have an additional holes radially displaced from the longitudinal axis hole 57, if desired.

Thus, it is apparent that there has been provided, in accordance with the invention, a fish bait jigger that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A fish bait jigger comprising:
   a. housing means for attaching to a selected piece of fishing equipment;
   b. an electric motor having a shaft and being mounted in the housing means;
   c. a single roller having a longitudinal axis and a periphery and being connected to the motor shaft for having the roller periphery rotated eccentrically about the motor shaft, the roller periphery being in contact through a subtended angle of less than 180 degrees with a fish line tied to the selected piece of fishing equipment; and
   d. power means for selectively rotating the motor, so that the fish line placed in contact with the roller periphery during rotation thereof will have a reciprocating motion imparted to the fish line free end.

2. The fish bait jigger of claim 1 wherein the roller periphery is circular.

3. A fish bait jigger comprising:
   a. housing means for attaching to a selected piece of fishing equipment, wherein the housing means comprises:
      i. a tubular member having a longitudinal axis and a wall;
      ii. a hub formed in the tubular member wall at a generally right angle to the longitudinal axis thereof, an electric motor being mounted in the hub; and
      iii. retainer means joined to the tubular member wall for removably gripping the selected piece of fishing equipment;
   b. a roller having a longitudinal axis and a periphery and being connected to the motor shaft for having the roller periphery rotated eccentrically about the motor shaft; and
   c. power means for selectively rotating the motor, so that a fish line tied to the selected piece of fishing equipment and placed in contact with the roller periphery during rotation thereof will have a reciprocating motion imparted to the fish line free end.

4. The fish bait jigger of claim 3 wherein:
   a. one end of the housing is open and one end of the housing is closed; and
   b. the housing means further comprises a cap for tightly sealing the housing open end.

5. A fish bait jigger comprising:
   a. housing means for attaching to a selected piece of fishing equipment;
   b. an electric motor having a shaft and being mounted in the housing means;
   c. a roller having a longitudinal axis and a circular periphery and being connected to the motor shaft for having the roller periphery rotated eccentrically about the motor shaft, wherein:
      i. the roller periphery is concentric with the longitudinal axis thereof; and
      ii. the roller defines a plurality of longitudinal holes parallel to and at different radial distances from the longitudinal axis; and d. power means for selectively rotating the motor, so that a fish line tied to the selected piece of fishing equipment and placed in contact with the roller periphery during rotation thereof will have a reciprocating motion imparted to the fish line free end and the amount of reciprocation of the fish line free end can be varied by connecting different holes in the roller to the electric motor shaft.

6. Apparatus for producing reciprocating motion to the line of a fishing pole or the like comprising:
  a. a roller having a longitudinal axis and a non-circular periphery in contact with the line, the roller periphery contacting the line through a subtended angle of less than 180 degrees about the roller longitudinal axis;
  b. electric motor means for rotating the roller; and
  c. housing means removably attached to the fishing pole or the like for mounting the motor means therein,
  so that rotating the motor means imparts an eccentric motion to the roller periphery and a corresponding reciprocation to the line.

7. Apparatus for producing reciprocating motion to the line of a fishing pole or the like comprising:
  a. a roller having a longitudinal axis and a non-circular periphery in contact with the line;
  b. electric motor means for rotating the roller; and
  c. housing means removably attached to the fishing pole or the like for mounting the motor means therein, wherein the housing means comprises:
    i. a tube having a longitudinal axis;
    ii. a hollow hub joined to the tube and extending therefrom at a generally right angle to the longitudinal axis; and
    iii. retainer means joined to the tube for removably attaching the tube to the fishing pole or the like,
  so that rotating the motor means imparts an eccentric motion to the roller periphery and a corresponding reciprocation to the line.

8. The apparatus of claim 7 wherein the motor means comprises:
  a. an electric motor mounted in the hub and having a shaft that extends outside the hub; and
  b. power means inserted in the tube for selectively energizing the motor.

9. The apparatus of claim 7 wherein the tube has an open end and a closed end, and wherein the housing means further comprises cap means for selectively sealing the housing open end.

10. In combination with a fishing pole having a longitudinal axis, a fish line, means for storing the fish line, and means for guiding the fish line, a fish bait jigger comprising:
  a. housing means for being removably attached to the fishing pole;
  b. a motor having a shaft and being mounted in the housing means; and
  c. an eccentric roller having a longitudinal axis and periphery means concentric with the longitudinal axis and in contact with the fish line between the means for storing the fish line on the fishing pole and the means for guiding the fish line on the fishing pole for being rotated eccentrically by the motor shaft, the periphery means being in contact with the fish line through a subtended angle of less than 180 degrees about the roller longitudinal axis,
  so that the free end of the fish line undergoes reciprocating motion in response to the eccentric rotation of the eccentric roller periphery means.

11. The combination of claim 10 wherein:
  a. the eccentric roller periphery means is formed as a circle; and
  b. the eccentric roller defines a hole having an axis parallel to and at a predetermined radial distance from the longitudinal axis, the hole being connected to the motor shaft,
  so that the eccentric roller can be rotated by the motor shaft about the hole axis and thereby have the eccentric roller circular periphery rotate eccentrically.

12. The combination of claim 10 wherein:
  a. the eccentric roller periphery means is in the form of a circle;
  b. the eccentric roller defines a plurality of holes having respective axes parallel to and at respective different predetermined radial distances from the longitudinal axis,
  so that the eccentric roller can be connected to the motor shaft by selected different holes to have the eccentric roller circular periphery rotate eccentrically and thereby produce different reciprocating motions to the free end of the fish line.

13. In combination with a fishing pole having a longitudinal axis, a fish line, means for storing the fish line, and means for guiding the fish line, a fish bait jigger comprising:
  a. housing means for being removably attached to the fishing pole, wherein the housing means comprises:
    i. a tubular member having a wall and a longitudinal axis generally parallel to the fishing pole longitudinal axis;
    ii. a hollow hub joined to and extending from the tubular member at a generally right angle thereto; and
    iii. retainer means joined to the tubular member for removably attaching the housing to the fishing pole with the housing longitudinal axis being generally parallel to the fishing pole longitudinal axis;
  b. a motor having a shaft and being mounted in the housing means, and
  c. an eccentric roller having a longitudinal axis and periphery means concentric with the longitudinal axis and in contact with the fish line between the means for storing the fish line on the fishing pole and the means for guiding the fish line one the fishing pole for being rotated eccentrically by the motor shaft,
  so that the free end of the fish line undergoes reciprocating motion in response to the eccentric rotation of the eccentric roller periphery means.

14. A method of jigging fish bait comprising the steps of:
  a. providing a fishing pole having a fish line with a free end and a second end stored on the fishing pole;
  b. tying a bait to the fish line free end;
  c. providing a single roller with a periphery and a longitudinal axis concentric therewith;
  d. placing the periphery of the roller in contact through a subtended angle of less than 180 degrees about the roller longitudinal axis with the fish line proximate the second end thereof; and e. eccentrically rotating the roller periphery to thereby cause the fish line free end to reciprocate and jig the bait.

15. The method of claim 14 wherein:
a. the step of placing the periphery of a roller in contact with the fish line comprises the step of providing a roller with a circular periphery; and
b. the step of eccentrically rotating the roller periphery comprises the step of rotating the roller about an axis that is non-concentric with the roller periphery.

16. The method of claim 14 wherein:
a. the step of placing the periphery of a roller in contact with the fish line comprises the step of providing a roller with a non-circular periphery; and
b. the step of eccentrically rotating the roller periphery comprises the step of rotating the roller about an axis that is concentric with the roller periphery.

* * * * *